United States Patent
Pruden et al.

(10) Patent No.: US 9,052,712 B2
(45) Date of Patent: Jun. 9, 2015

(54) REGULATOR VALVE WITH AXIAL VENT

(71) Applicant: Hamilton Sundstrand Corporation, Windsor Locks, CT (US)

(72) Inventors: Gary L. Pruden, Somers, CT (US); George D. Rogers, Enfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 432 days.

(21) Appl. No.: 13/661,102

(22) Filed: Oct. 26, 2012

(65) Prior Publication Data

US 2014/0116546 A1     May 1, 2014

(51) Int. Cl.
- G05D 11/00 (2006.01)
- G05D 7/00 (2006.01)
- F15B 11/17 (2006.01)
- F15B 13/042 (2006.01)

(52) U.S. Cl.
CPC ........ G05D 7/00 (2013.01); F15B 11/17 (2013.01); F15B 13/042 (2013.01); F15B 2211/20584 (2013.01); F15B 2211/255 (2013.01); F15B 2211/2654 (2013.01); F15B 2211/50536 (2013.01); F15B 2211/5157 (2013.01); F15B 2211/528 (2013.01)

(58) Field of Classification Search
CPC .................................................. G05D 11/006
USPC ............ 137/100, 111, 112, 113, 114, 115.26; 417/286; 60/405
See application file for complete search history.

(56) References Cited

U.S. PATENT DOCUMENTS

| | | | |
|---|---|---|---|
| 2,905,191 A * | 9/1959 | Vander Kaay | 60/430 |
| 3,400,735 A | 9/1968 | Favors et al. | |
| 3,621,867 A | 11/1971 | Johnson | |
| 3,882,678 A * | 5/1975 | Fassbender | 60/405 |
| 3,951,162 A | 4/1976 | Wilke | |
| 4,073,140 A * | 2/1978 | Lang et al. | 60/405 |
| 4,197,874 A | 4/1980 | Neff | |
| 6,173,728 B1 * | 1/2001 | Venable et al. | 137/112 |
| 6,471,633 B1 | 10/2002 | Freed | |
| 6,583,525 B2 | 6/2003 | Dyer et al. | |
| 6,789,562 B2 | 9/2004 | Dyer et al. | |
| 7,740,228 B2 | 6/2010 | Simpson et al. | |
| 7,743,820 B2 | 6/2010 | Wei | |
| 8,127,786 B2 | 3/2012 | Emmons | |

* cited by examiner

*Primary Examiner* — Kevin Murphy
*Assistant Examiner* — R. K. Arundale
(74) *Attorney, Agent, or Firm* — Carlson, Gaskey & Olds, PC

(57) ABSTRACT

A first inlet port extends radially through a valve sleeve into an internal bore. A first outlet port extends radially outwardly through an outer periphery of the valve sleeve. A second inlet port on an opposed side of the first outlet port from the first inlet port, extends radially through a wall of the valve sleeve. A valve spool is received in the internal bore and has a first channel at an outer peripheral surface selectively communicating the first inlet port to the first outlet port. The valve spool has a second channel at the outer peripheral surface that communicates the second inlet port to an axial vent formed in an internal surface of the valve sleeve. The axial vent extends axially to communicate the second channel to the first outlet port. A pumping system is also disclosed.

15 Claims, 2 Drawing Sheets

REGULATOR VALVE WITH AXIAL VENT

STATEMENT REGARDING FEDERALLY SPONSORED RESEARCH

This invention was made with government support under Contract No. N00019-08-G-0002/XT12 awarded by the United States Navy. The Government has certain rights in this invention.

BACKGROUND OF THE INVENTION

This application relates to a regulator valve that sets the supply pressure in a hydraulic actuation system. This regulator valve manages the output flow from two gear pumps.

Regulator valves are used in any number of applications. In general, a regulator valve primarily consists of a valve sleeve, spool, and a spring. Valve porting and spring load is defined to achieve a desired pressure setting range over various load conditions (i.e., flow demand). The magnitude of a set pressure is the direct result of the valve spool area and balance of forces acting on the spool at any given hydraulic load condition, which include the spring force and pressure forces acting on the valve spool.

In one example, a main pump supplies hydraulic fluid to an actuator to control the pitch of a propeller. The main pump is capable of supplying sufficient fluid flow to meet much of the operational requirements of the actuator.

However, under transient conditions, the main pump may not be capable of supplying sufficient fluid flow to achieve the desire actuator performance requirements. Thus, a standby pump is also provided that can supplement the hydraulic fluid provided by the main pump to meet actuator performance requirements. The standby pump has an outlet connected to a regulator valve, and is also connected to a supply line downstream of the main pump through a check valve.

During low system flow demand conditions, the regulator valve will return the full standby pump flow to a sump, while a main metering window of the valve controls the system pressure setting by porting unused main pump flow to a sump. During high system flow demand conditions, the regulator valve spool repositions to close the main metering window of the regulator valve. This repositioning is caused by a change in the spool force balance due to a decrease in system pressure that occurs when system flow demand exceeds the main pump output. This valve spool translation continues until the main metering window closes the flow path to sump, and the standby metering window closes adequately to increase standby pump pressure to overcome a check valve pressure setting. At this point, the standby pump flow supplements the main pump flow, the main metering window is closed, and the system pressure setting is controlled by the regulator valve standby metering window in the same manner as described for the main metering window at low system flow demand conditions.

The regulator valve main metering port vents the unused main pump flow to the sump during low flow demand conditions. In the prior art, the main pump vent extended radially outwardly through a valve window opening established by a valve spool land edge and valve sleeve port. Cavitation bubble formation has occurred on the low pressure side of this radial discharge window configuration caused by localized pressure gradients that are of a magnitude less than the hydraulic system fluid vapour pressure. The subsequent collapse of formed bubbles on the surface of the main housing sump bore where vented flow is discharged is undesirable.

SUMMARY OF THE INVENTION

A regulator valve has a valve sleeve incorporating a first inlet port extending radially through the valve sleeve into an internal bore. A first outlet port extends radially outwardly from the internal bore through an outer periphery of the valve sleeve. A second inlet port is on an opposed side of the first outlet port relative to the first inlet port. The second inlet port extends radially through a wall of the valve sleeve and into the internal bore. A valve spool is received in the internal bore, and is biased by a spring force. The valve spool has a first channel at an outer peripheral surface selectively communicating the first inlet port to the first outlet port. The valve spool has a second channel at an outer peripheral surface that communicates the second inlet port to an axial vent formed in an internal surface of the valve sleeve. The axial vent extends axially to communicate the second channel to the first outlet port. A pumping system is also disclosed.

These and other features may be best understood from the following drawings and specification.

DETAILED DESCRIPTION

Figure 1:
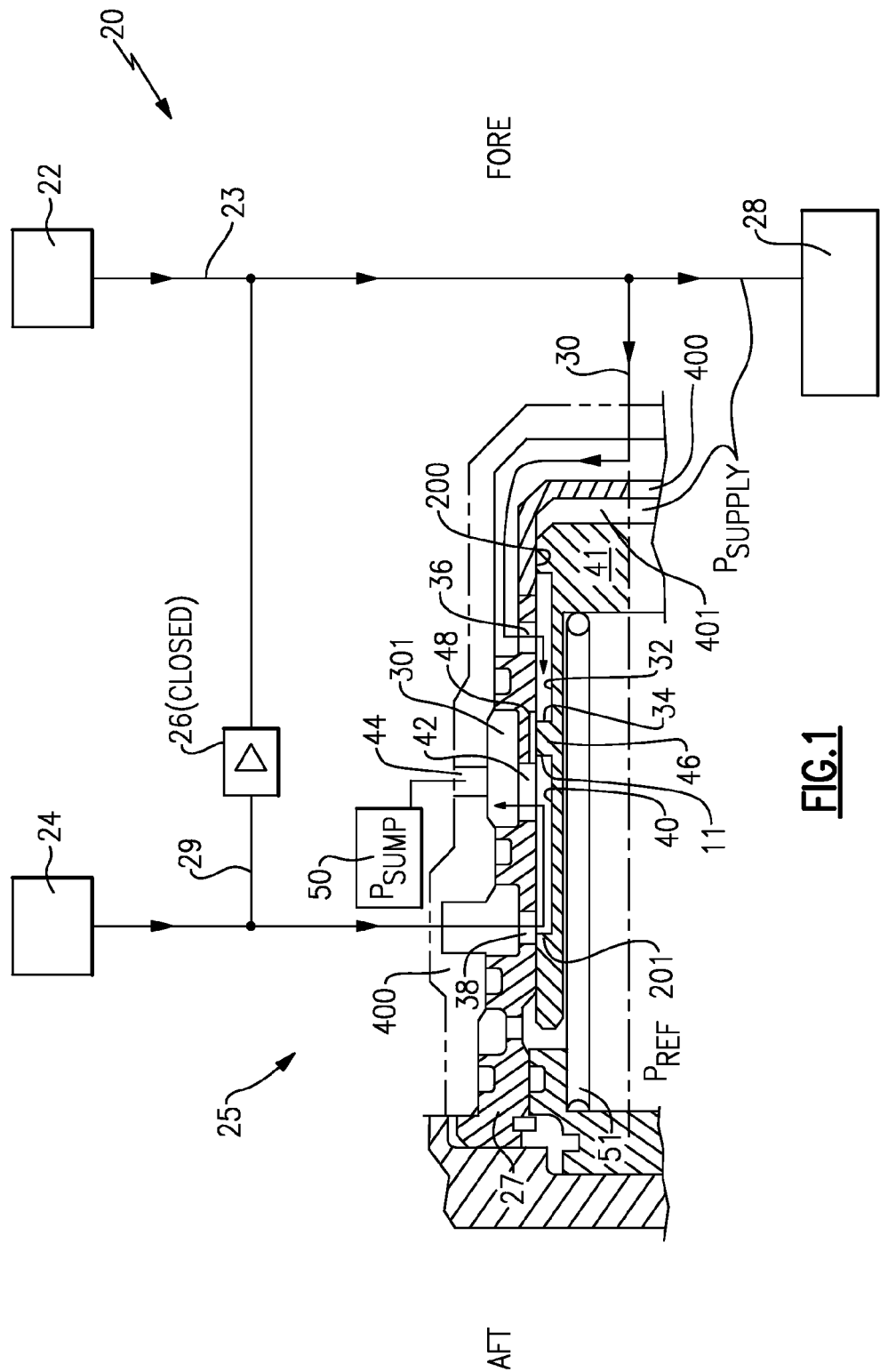
FIG. 1 shows a valve incorporated into a fluid pumping system.

A fluid pumping system 20 is illustrated in FIG. 1. A main pump 22 moves hydraulic fluid into a discharge line 23 headed for a use 28. In one application, the use 28 is a pitch control for a propeller, such as utilized on an aircraft.

A standby or supplemental pump 24 also moves hydraulic fluid. The standby pump 24 moves fluid to a regulator valve 25, and through at least one inlet port 38 in a valve sleeve 27. In fact, there may be two equally spaced ports 38 as more clearly seen in FIG. 2. Fluid passing into the ports 38 will reach a channel 40 bounded by the outer periphery of a valve spool 41 and internal bore 200 of valve sleeve 27. The channel 40 communicates with a radially extending outlet port 42 leading to an annulus 301 in a main housing 400. An internal plumbing line 44, and to a pressurized sump 50 at a pressure $P_{SUMP}$. In fact, there may be four equally spaced ports 42. Channel 40 communicates with the entire cross-sectional surface of the port 42 for all valve spool operating positions. In the position illustrated in FIG. 1, all of the fluid moved by the standby pump 24 will be returned to the sump 50.

A tap line 30 from the discharge line 23 extends into the valve sleeve 27 through an inlet port 36. A control tap 400 supplies the same pressure fluid at $P_{SUPPLY}$ to a fore side of spool 41 in a chamber 401. A reference pressure $P_{REF}$ port and a spring force from spring 41 resist this force.

In fact, there may be two equally spaced ports 36. The inlet ports 36 are on an opposed side of outlet ports 42 relative to inlets port 38. Inlet ports 36 extend radially inwardly into internal bore 200. The fluid then reaches a channel 32 formed in the outer periphery of the valve spool 41. Channel 32 has an end 34 which is shown aligned with an axial vent 48 in the sleeve 27. The axial vent 48 is an internal flow passage that may be formed by a group of four axial slots 48 machined on the sleeve inner diameter and the outer diameter of a spool land. Vents 48 change the fluid flow direction from radial outward to axial fore and aft.

The axial vent 48 communicates with outlet ports 42 leading to annulus 301 in the main housing, internal plumbing line 44, and to a pressurized sump 50.

Therefore, the excess fluid flow capacity of main pump 22, as vented from the tap line 30 to outlet port 42, does not move radially outwardly into the sleeve 27, but instead moves through the restricted axial vents 48. This increases the pressure of the fluid on a discharge side 11 of a spool metering land 46 compared to that which occurs with the prior art direct radial vent, and creates an intermediate pressure between the spool metering land inlet side and the pressurized sump.

The higher back pressure reduces the potential for formation of cavitation bubbles by increasing the fluid pressure on the valve metering land discharge side adequately to prevent pressure over-shoot below the fluid vapor pressure. In addition, the higher back pressure increases the potential for any formed bubbles to be reabsorbed into the hydraulic fluid before entering the main housing bore and causing housing damage.

In addition, the axial vents 48 diffuse the flow by mixing main pump metered flow with low pressure standby pump bypass flow, prior to exiting the valve and entering the housing return bore. In the event cavitation bubbles are formed, the flow diffusion minimizes the concentration of air entrained fluid that can be applied to any given area of the housing bore surface. This minimizes the potential for housing damage. Under such conditions, the entire flow from standby pump 24 is bypassed.

During normal operation, the main pump 22 supplies excess fluid to the discharge line 23. As an example, if the use 28 were to require nine quarts per minute, the main pump may be supplying ten quarts per minute. In such a circumstance, the excess fluid would be bypassed from the tap line 30, through the inlet port 36, channel 32, axial vent 48, and into the outlet port 42.

However, under certain circumstances, the main pump 22 supplies insufficient fluid. When this occurs, the pressure in line 23 drops. Under such circumstances, the valve spool 41 will move aft to fore (see Aft to Fore in FIG. 1) to simultaneously close ports 36, and close the standby metering ports 38 partially to restrict the amount of standby pump fluid which is being bypassed. That is, the upstream end 201 of channel 40 will be moved to the Fore as shown in FIG. 1, such that less fluid is bypassed. This in turn will increase the pressure in line 29. The pressure in line 29 increases until the spring force and line 23 pressure holding the check valve 26 closed is overcome, and the standby pump 24 will begin to supplement the flow from the main pump 22 to the discharge line 23. At this point the system pressure setting is controlled by the port 38 opening established by the aft valve spool 41 land and ports 38, in a manner identical to that of the main metering window during low system flow demand conditions.

As an example, the valve spool 41 may move further to the right from the position shown in FIG. 1 such that an upstream end 201 of the channel 40 will establish a window opening that results in the valve force balance previously established by the main metering window. In the same position, the end 34 of the channel 32 will no longer communicate with the axial vent 48. This transfers the pressure setting function from the main metering window to the back-up metering window.

Figure 2:
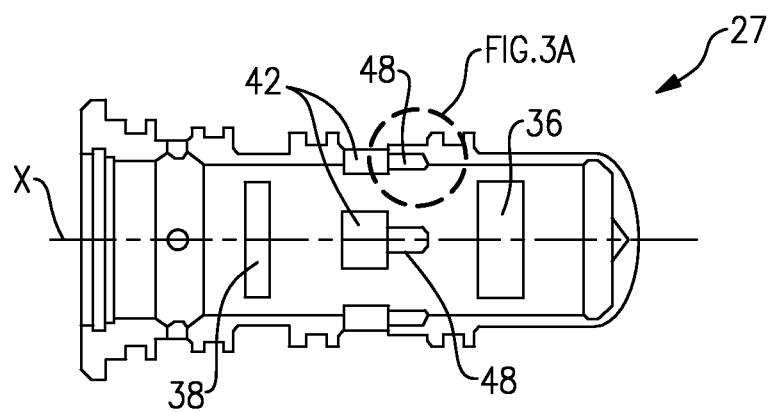
FIG. 2 shows a view of a valve sleeve.

FIG. 2 shows another view of the valve sleeve 27. As can be appreciated, there are inlet ports 36 and 38. The inlet ports 36 extend for a greater axial distance than do inlet ports 38. There are two of each of the inlet ports 36 and 38, spaced equally about a center line X of the valve sleeve 27. As shown, the axial vents 48 communicate directly into one of the outlet ports 42. There are four of the outlet ports 42, and four of the axial vents 48.

Figure 3A:
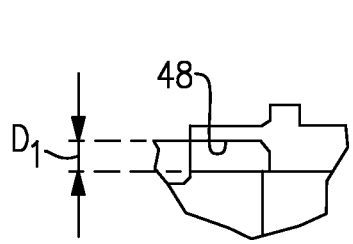
FIG. 3A shows a detail of the FIG. 2 sleeve at the area identified in FIG. 2 by the numeral 3.
Figure 3B:
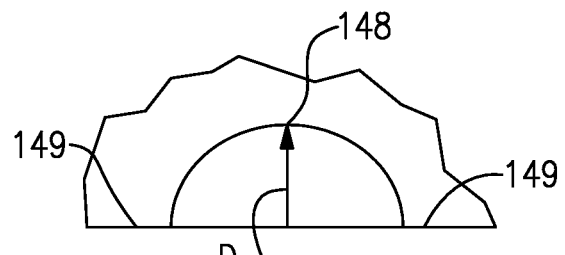
FIG. 3B shows another detail of the FIG. 2 sleeve.

As shown in FIG. 3A, the axial vents 48 extend for a radial dimension $D_1$. In one embodiment, a nominal height of $D_1$ was 0.062 inch (0.16 cm) nominal. As can be appreciated from FIG. 3B, the axial vent 48 in this embodiment is formed along a curved surface, and has a point 148 where the dimension $D_1$ is defined, which is a full radius that defines the passage cross-section. Of course, various combinations of nominal depth dimension, number of ports, and nominal cross-section size and shape can be specified to achieve the required flow velocity and pressure drop for any given set of application flow and pressure requirements.

Figure 4:
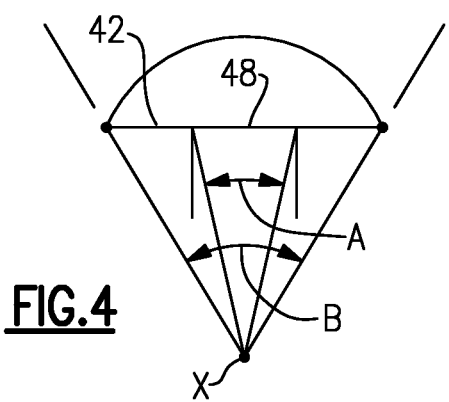
FIG. 4 shows a further geometric detail.

Returning to FIG. 2, one can see that a downstream end of the axial vent 48 extends into outlet port 42. As shown in FIG. 4, an angle B can be defined between the circumferential extent of the ends of the outlet port 42, while a smaller angle A is defined between circumferential edges 149 (see FIG. 3B) of the axial vent 48. The two angles are measured from center axis X. In one embodiment, angle A was 21 degrees nominal, and angle B was 51 degrees nominal. Of course, various ratios of angle A to angle B can be specified to achieve the required flow velocity and pressure drop for any given set of application flow and pressure requirements.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A regulator valve comprising.
    a valve sleeve centered on an axis, and incorporating a first inlet port extending radially through said valve sleeve into an internal bore, and a first outlet port extending radially outwardly from said internal bore through an outer periphery of said valve sleeve, and a second inlet port on an opposed side of said first outlet port from said first inlet port, said second inlet port extending radially through a wall of said valve sleeve and into said internal bore; and
    a valve spool received in said internal bore, and biased by a spring force, said valve spool having a first channel at an outer peripheral surface selectively communicating said first inlet port to said first outlet port, and said valve spool having a second channel at the outer peripheral surface, said second channel selectively communicating said second inlet port to an axial vent formed in an internal surface of said valve sleeve, said axial vent extending axially to communicate said second channel to said first outlet port.

2. The regulator valve as set forth in claim 1, wherein said valve sleeve has two of said inlet ports equally spaced about said axis, four of said outlet ports, four of said axial vents each communicating to one of said outlet ports, and two of said second inlet ports equally spaced about the axis.

3. The regulator valve as set forth in claim 2, wherein a downstream end of said axial vent extends for a smaller circumferential distance than does a portion of said outlet port that communicates with said axial vents with the circumferential distances measured from said axis.

4. The regulator valve as set forth in claim 3, wherein a first angle can be defined between circumferential ends of said axial vent at the location that communicates with said outlet port, and a second angle can be defined between circumferential ends of the outlet port at a side where said axial vent communicates with said outlet port, both angles being measured from said axis and a ratio of said first and second angles is between 0.35 and 0.45.

5. The regulator valve as set forth in claim 1, wherein said axial vent communicates into said outlet port at a downstream end, and a first angle can be defined between circumferential ends of the outlet port at a side where said axial vent communicates with the outlet port, and between circumferential ends of said axial vent at the location where it communicates with said outlet port, said first and second angles measured from said axis and a ratio of said first and second angles is between 0.35 and 0.45.

6. The regulator valve as set forth in claim 1, wherein said axial vent has a cross-sectional shape of a circular portion formed to a single radius.

7. The regulator valve as set forth in claim 6, wherein said single radius is 0.062 inch (0.16 cm) nominal.

8. A pumping system comprising:
a main pump for delivering a fluid to a discharge line;
a standby pump for selectively supplementing the fluid delivered by said main pump to said discharge line;
said standby pump directing fluid into a first inlet port on a regulator valve, said main pump directing fluid to a second inlet port on a regulator valve;
the regulator valve having a valve sleeve centered on an axis and incorporating a first inlet port extending radially through said valve sleeve into an internal bore, and a first outlet port extending radially outwardly from said internal bore through an outer periphery of said valve sleeve, and a second inlet port on an opposed side of said first outlet port from said first inlet port, said second inlet port extending radially through a wall of said valve sleeve and into said internal bore, and
a valve spool received in said internal bore, and biased by a spring force, said valve spool having a first channel at an outer peripheral surface selectively communicating said first inlet port to said first outlet port, and said valve spool having a second channel at the outer peripheral surface, said second channel selectively communicating said second inlet port to an axial vent formed in an internal surface of said valve sleeve, said axial vent extending axially to communicate said second channel to said first outlet port.

9. The pumping system as set forth in claim 8, wherein said standby pump has a supply line communicating to said discharge line through a check valve.

10. The pumping system as set forth in claim 9, wherein if a volume of fluid supplied by said main pump to said discharge line is insufficient, said check valve will open, and said standby pump will begin supplementing the fluid delivered to said discharge line, and said regulator valve will move to limit the amount of fluid delivered to said first outlet port.

11. The pumping system as set forth in claim 10, wherein said first outlet port communicating with a sump for the pumping system.

12. The pumping system as set forth in claim 8, wherein said discharge line communicating with a pitch control for a propeller.

13. The pumping system as set forth in claim 8, wherein said valve sleeve has two of said inlet ports equally spaced about said axis, four of said outlet ports, four of said axial vents each communicating to one of said outlet ports, and two of said second inlet ports equally spaced about the axis, a downstream end of said axial vent extends for a smaller circumferential distance than does a side of said outlet port that communicates with said axial vents with the circumferential distances measured from said axis, a first angle can be defined between circumferential ends of said axial vent at the location that communicates with said outlet port, and a second angle can be defined at the outlet port at the side where said axial vent communicates with said outlet port, the two angles being measured from said axis, and a ratio of said first and second angles is between 0.35 and 0.45.

14. The pumping system as set forth in claim 8, wherein said axial vent has a cross-sectional shape of a circular portion formed to a single radius.

15. The pumping system valve as set forth in claim 14, wherein said single radius is 0.062 inch (0.16 cm) nominal.

\* \* \* \* \*